(12) United States Patent
Leaming

(10) Patent No.: US 6,783,078 B1
(45) Date of Patent: Aug. 31, 2004

(54) UNIVERSAL SERIAL BUS (USB) SMART CARD HAVING READ BACK TESTING FEATURES AND RELATED SYSTEM, INTEGRATED CIRCUIT, AND METHODS

(75) Inventor: Taylor J. Leaming, Austin, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 10/435,124

(22) Filed: May 9, 2003

(51) Int. Cl.⁷ .............................................. G06K 19/06
(52) U.S. Cl. ..................................................... 235/492
(58) Field of Search ........................................ 235/492

(56) References Cited

U.S. PATENT DOCUMENTS

| 6,006,303 | A | 12/1999 | Barnaby et al. ............. 710/244 |
| 6,122,676 | A | 9/2000 | Brief et al. ...................... 710/9 |
| 6,157,966 | A | 12/2000 | Montgomery et al. .......... 710/8 |
| 6,157,975 | A | 12/2000 | Brief et al. ................... 710/104 |
| 6,402,026 | B1 | 6/2002 | Schwier ....................... 235/379 |
| 6,439,464 | B1 | 8/2002 | Fruhauf et al. .............. 235/492 |
| 6,463,537 | B1 | 10/2002 | Tello ........................... 713/182 |
| 6,523,081 | B1 | 2/2003 | Karlsson et al. ............. 710/305 |
| 6,547,150 | B1 | 4/2003 | Deo et al. ..................... 235/492 |
| 2001/0056513 | A1 | 12/2001 | Ueda ............................ 710/100 |
| 2002/0066791 | A1 | 6/2002 | Leydier et al. .............. 235/492 |
| 2003/0054880 | A1 * | 3/2003 | Lam et al. ..................... 463/29 |
| 2003/0163627 | A1 * | 8/2003 | Deng et al. .................. 710/305 |

FOREIGN PATENT DOCUMENTS

| WO | 00/16255 | 3/2000 | ........... G06K/19/07 |
| WO | 02/23357 | 3/2002 | ........... G06F/13/38 |

* cited by examiner

Primary Examiner—Thien M. Le
Assistant Examiner—April Nowlin
(74) Attorney, Agent, or Firm—Lisa K. Jorgenson; Christopher F. Regan

(57) ABSTRACT

An integrated circuit for a smart card may include a universal serial bus (USB) transceiver and a microprocessor connected to the USB transceiver and operable in a test mode and a user mode. The microprocessor, when in the test mode, upon receiving at least one test request from the USB host device may cause the USB transceiver to output test data, read back the test data from the USB transceiver, compare the test data with the test data read back from USB transceiver, and generate test results for the USB host device based upon the comparison.

32 Claims, 5 Drawing Sheets

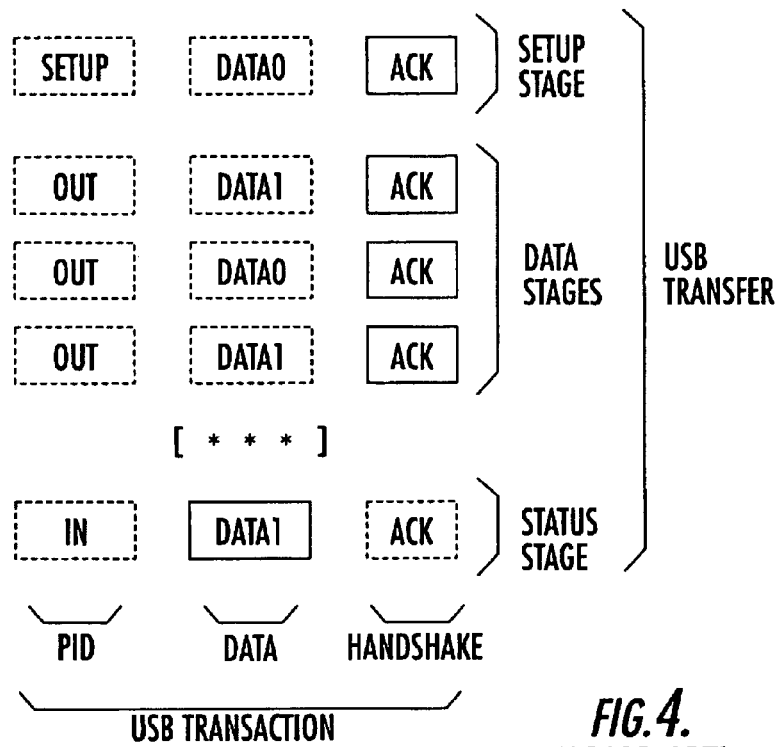

FIG.4.
(PRIOR ART)

(1) <SETUP> <DEFAULT_REQ (A)> <ACK>
    <OUT> <DATA (A)> <ACK>
    <OUT> <DATA (A)> <ACK>
    <OUT> <DATA (A)> <ACK>

(2) <SETUP> <DATA (A)> <ACK>
    <OUT> <DATA (A)> <ACK>
    <OUT> <ALT_REQ (A)> <ACK>
    <OUT> <DATA (A)> <ACK>

(3) <SETUP> <ALT_REQ (A)> <ACK>
    <OUT> <DATA (A)> <ACK>
    <OUT> <BOGUS DATA> <ACK>
    <OUT> <DATA (A)> <ACK>

FIG.5.

(1) <SETUP> <ALT_REQ (C)> <ACK>
    <OUT> <DATA (B)> <ACK>
    <OUT> <DATA (B)> <ACK>
    <OUT> <DATA (B)> <ACK>

(2) <SETUP> <ALT_REQ (B)> <ACK>
    <OUT> <DATA (C)> <ACK>
    <OUT> <DATA (C)> <ACK>
    <OUT> <DATA (C)> <ACK>

FIG.6.

UNIVERSAL SERIAL BUS (USB) SMART CARD HAVING READ BACK TESTING FEATURES AND RELATED SYSTEM, INTEGRATED CIRCUIT, AND METHODS

FIELD OF THE INVENTION

The present invention relates to the field of information processing and storage, and, more particularly, to smart card systems and related methods.

BACKGROUND OF THE INVENTION

Smart cards are becoming increasingly more popular for security and personal identification applications. For example, smart cards are currently being used for storing sensitive data such as medical records, banking information, etc. In perhaps their most common form, smart cards have a card body which resembles a credit card in size, shape, and thickness, and they may even be made out of similar materials, such as plastic. Yet, rather than simply having a magnetic stripe to store sensitive information (e.g., account numbers, user identification, etc.) as standard credit cards do, smart cards generally include an integrated circuit (IC). The IC not only includes a non-volatile memory for storing such sensitive information, but it may also include a microprocessor for processing this information and communicating with a host device via a card reader, for example. Accordingly, not only can smart cards store more information than magnetic stripe cards, but they also have much greater functionality.

Various protocols have emerged to standardize smart card operation and communications. One of the earliest of these was developed by the International Organization for Standardization (ISO) and is known as the ISO7816-X protocol. In particular, this protocol is set forth in ISO documents ISO 7816-1 (Physical Characteristics), ISO 7816-2 (Dimensions and Locations of Contacts), ISO 7816-3 (Electronic Signals and Transmission Protocols), and ISO 7816-10 (Electronic Signals and Answer to Reset for Synchronous Cards), for example, all of which are hereby incorporated herein in their entirety by reference.

Furthermore, in response to the increasing popularity of the universal serial bus (USB) architecture, increasing numbers of smart cards continue to be developed which operate in accordance with the USB protocol. This protocol is set forth in the Universal Serial Bus Specification, Revision 2.0, Apr. 27, 2000, published by USB Implementers Forum, Inc., which is hereby incorporated herein in its entirety by reference. The USB architecture is particularly advantageous in that it provides a standard "plug and play" interface for devices external to a computer, for example. That is, external peripheral devices can be relatively quickly and easily installed and removed from a computer without having to open or power down the computer.

While the ISO7816-X and USB protocols provide certain basic tools and rules for developing smart card systems, there still remain many practical challenges to smart card implementation. One such challenge is the testing of smart card IC designs. That is, in addition to the microprocessor and non-volatile memory, numerous other components are typically included in a smart card IC for communicating with the host device and performing smart card operations. For example, these additional components may include transceivers, transmission buffers, interface circuitry, random access memory (RAM) for the microprocessor, internal clocks, state machines, etc. Thus, a relatively large number of tests may be required to ensure that each of these components operates as intended under different operating constraints or with different data sets.

Perhaps the most common approach for testing the operation of IC components is to use manufacturing-grade IC test machines. While such test machines are capable of testing many of the above circuit components, these machines can cost hundreds of thousands or even millions of dollars to purchase and operate. Thus, it will typically be practical to have only a very limited number of such test machines. Yet, to test most or all of the above IC components for each IC manufactured can be cost prohibitive because this requires that each IC spend a relatively long time on the tester. This, in turn, slows production and thus increases per unit costs. As such, a minimal set of operating tests may be defined to ensure basic components are operating correctly, but this could mean many other functions will go untested.

Because of the computing power resident in the microprocessor of the smart card IC, certain testing operations may be performed internally to the smart card. By way of example, U.S. Pat. No. 6,157,966 to Montgomery et al. is directed to an ISO7816 type smart card which uses debugging applications resident on the card to aid in the development of smart card programs. The debugging applications can provide internal state and runtime information, such as for a memory test. Results from the test are then output and may include a number of rows or columns of a memory unit that passed the test.

Despite the advances provided by the above-noted approach, further improvements in smart card testing may be needed in certain areas. One such area is USB smart cards, for example, which are continuing to gain popularity and will likely need to be manufactured in ever increasing quantities.

Another challenge in smart card development is protecting communications between the smart card and host device from would-be hackers or eavesdroppers. Encryption is perhaps the most widely used approach for securing data transmissions, as it is used in numerous applications such as wireless and wired telephone networks, satellite communications, and computer networks, to name a few. Smart cards also have been developed which incorporate encryption techniques. By way of example, U.S. Pat. No. 6,463,537 to Tello discloses a secure computer that will not boot up or recognize any data storage or communication peripheral devices without a matching personalized smart card. The card has an encrypted digital signature stored therein which complements an encrypted digital signature stored in the computer. An encryption algorithm is also used for encrypting data sent between the smart card and the computer.

While encryption does provide an increased level of protection against would-be hackers, their sophistication and ability to crack encryption algorithms continues to improve. As such, further security protection is always desirable, particularly where extremely sensitive information, such as health records or financial data, is to be protected.

One additional challenge for smart card development is to increase the efficiency of communications between a host device and a smart card, which often shares the host device's communications bus with other peripheral devices, for example. Numerous approaches to increasing bus utilization have been developed, one of which is set forth in U.S. Pat. No. 6,006,303 to Barnaby et al. This patent is directed to a shared access prior encoding/decoding and arbitration scheme which takes into account varying device requirements, such as latency, bandwidth, and throughput, which are stored and dynamically updated based upon changing access demand conditions. That is, these requirements are prioritized to determine which devices get access to shared access resources at a given time. The patent notes that the invention may be implemented within an IC chip for use in smart card readers, for example.

While such prioritization approaches may be advantageous in certain applications, they may not be desirable or even practical in other applications. As such, different approaches may be more appropriate for increasing bus utilization in some smart card applications.

SUMMARY OF THE INVENTION

In view of the foregoing background, it is therefore an object of the present invention to provide an integrated circuit for a universal serial bus (USB) smart card with enhanced testing features and related methods.

This and other objects, features, and advantages in accordance with the present invention are provided by an integrated circuit for a smart card which may include a USB transceiver and a microprocessor connected to the USB transceiver and operable in a test mode and a user mode. The microprocessor, when in the test mode, upon receiving at least one test request from a USB host device may cause the USB transceiver to output test data, read the test data back from the USB transceiver, compare the test data with the test data read back from the USB transceiver, and generate test results for the USB host device based upon the comparison. As such, the USB transceiver may be tested internally, and without the need for an expensive external test machine.

More particularly, the integrated circuit may further include a state machine connected to the microprocessor, and the microprocessor when in the test mode upon receiving the at least one test request may further cause the state machine to generate the test data. The microprocessor may also cause the USB transceiver to continuously write the test data.

The integrated circuit may further include a clock circuit connected to the microprocessor for generating a clock signal. In one embodiment, the test data may be generated based upon the clock signal, and the microprocessor may thus compare the test data with the test data read back from the USB transceiver to determine a timing deviation therebetween. As such, the microprocessor may generate the test results by comparing the timing deviation with at least one timing threshold.

In addition, the integrated circuit may also include at least one buffer connected to the USB transceiver and the microprocessor for buffering data transmitted between the USB transmitter and the host device. As such, the microprocessor may read back the test data output from the USB transceiver via the at least one buffer.

Furthermore, the at least one test request may be at least one vendor specific request (VSR). Also, the integrated circuit may also include a switch for disabling the microprocessor from operating in the test mode. By way of example, the switch may be an integrated fuse which can be blown to permanently disable the test mode, such as when the integrated circuit has completed testing during the manufacturing process.

A smart card is also provided in accordance with the present invention for operating in a USB mode. The smart card may include a smart card body and an integrated circuit carried thereby, such as the one described briefly above. Furthermore, a USB smart card system in accordance with the present invention may include a USB host device having a USB port, a USB smart card reader connected to the USB port, and a USB smart card, such as the one briefly described above, for communicating with the USB host device via the smart card reader.

A method aspect of the invention is for testing an integrated circuit including a USB transceiver and a microprocessor connected to the USB transceiver and operable in a test mode and a user mode. The method may include placing the microprocessor in the test mode and sending at least one test request to the microprocessor from the USB host device. Furthermore, based upon the at least one test request, the method may also include causing the USB transceiver to output test data, reading the test data back from the USB transceiver, comparing the test data with the test data read back from the USB transceiver, and generating test results for the USB host device based upon the comparison.

BRIEF DESCRIPTION OF THE DRAWINGS

FIG. 4 is a data flow diagram illustrating the basic form of a USB control mode transaction in accordance with the prior art.

FIGS. 5 and 6 are data flow diagrams each illustrating a series of vendor specific requests (VSRs) with associated data groups to be sent between the host device and smart card of FIG. 1 in accordance with the present invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
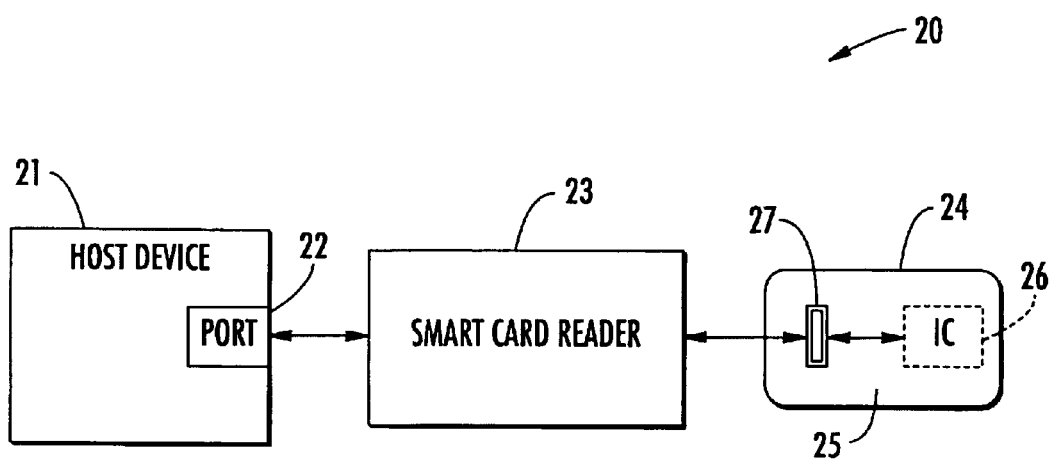
FIG. 1 is schematic block diagram of a smart card system in accordance with the present invention.

Referring initially to FIG. 1, a smart card system 20 in accordance with the present invention illustratively includes a host device 21 having a communications port 22, a smart card reader 23 connected to the communications port, and a smart card 24 to be read by the smart card reader. Generally speaking, the host device 21 will be a computer of some type, which could be a personal computer (PC), laptop, etc., for example. Of course, smart card systems take many forms, so the host device 21 could be any number of computing devices capable of interfacing with a smart card, such as a cable or satellite television receiver/decoder, an automated teller machine (ATM) or other banking machine, a point-of-sale (POS) device (e.g., a cash register), etc., depending upon the given application. Another example would be a personal data assistant (PDA) or other USB device that is ordinarily a slave to a USB bus master (i.e., a host), but when used in a USB on-the-go (OTG) mode can itself act as a limited USB bus master.

In the case of an ISO7816 type smart card system, the port 22 may be a serial communications port connected to the internal bus of the host device 21 (not shown). In the case of a universal serial bus (USB) type smart card system, the port 22 will be a USB port which is also connected to the internal bus of the host device 21, as will be appreciated by those of skill in the art. The smart card system 20 of the present invention may advantageously be implemented as an ISO7816 type system, a USB system, or a dual mode system which operates in both modes, for example, similar to the system described in U.S. Pat. No. 6,439,464 to Fruhauf et al., assigned to the assignee of the present invention, and which is hereby incorporated herein in its entirety by reference. Of course, other suitable smart card formats may also be used, as will be appreciated by those of skill in the art.

The smart card reader 23 is of a type compatible with the particular operational protocol being implemented in the system 20 (e.g., an ISO7816 type card reader, a USB type card reader, etc.). Of course, multiple readers 23 may be used, as well as multi-purpose readers which read more than one type of smart card or multi-mode smart cards. In addition, the card reader 23 can be remotely located with respect to the host device 21, but it need not be. That is, in some embodiments the card reader 23 can be incorporated within the host device 21 or carried by a housing thereof, as will be appreciated by those of skill in the art.

The smart card 24 illustratively includes a card body 25 and an integrated circuit (IC) 26 carried by the card body. Further, the smart card also illustratively includes contacts 27 for providing an electrical connection between the smart card reader 23 and the IC 26. Of course, it will be appreciated that in some embodiments the smart card 24 may in fact be wireless and thus not require the contacts 27. In such event, an antenna may be used instead of the contacts 27, for example. Yet, for clarity of explanation, the present application will refer particularly to the examples of ISO7816 and USB type smart cards, each of which uses a respective connector configuration defined by the various protocol documents noted above. Thus, the use of physical contacts 27 on the card body 25 (and corresponding contacts at the card reader 23) will be assumed for purposes of the present discussion.

It should be noted that the smart card body 25 may be made of various types of materials and take various shapes. Perhaps the most common material used for smart cards is plastic, but other suitable materials may also be used. Moreover, smart cards are also generally rectangular in shape and thin enough to fit in a wallet, similar to a credit card, but again, other shapes and thicknesses may be used.

The IC 26 may be encased within the card body 25, as illustratively shown, or it may be recessed therein but still exposed. Other mounting configurations are possible, as will be appreciated by those of skill in the art, which are anticipated by the present invention. It should also be noted that the smart card 24 may be incorporated or built into another device as a token or identification circuit therefor, for example.

Figure 2:
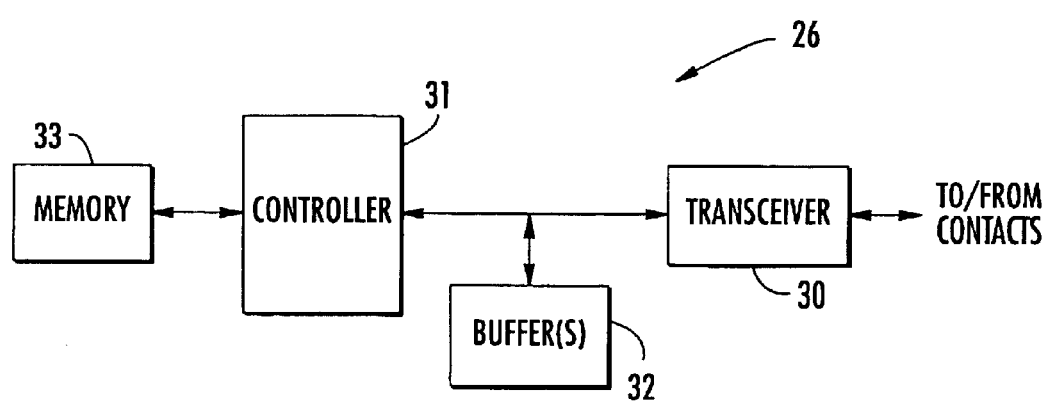
FIG. 2 is schematic block diagram of the smart card integrated circuit illustrated in FIG. 1.

Turning now to FIG. 2, the basic components of the IC 26 will now be described. In particular, the IC 26 includes a transceiver 30 which is connected to the contacts 27 and sends/receives signals to/from the host device 21 via the smart card reader 23, as will be appreciated by those of skill in the art. The transceiver 30 is controlled by a controller 31 which also performs the various smart card operations, as will be discussed further below. Furthermore, one or more buffers 32 are preferably included within the IC 26 for buffering signals transmitted between the IC and the host device 21. Further, a card memory 33 is also included for storing various data required by the controller 31, which will also be discussed further below.

Figure 3:
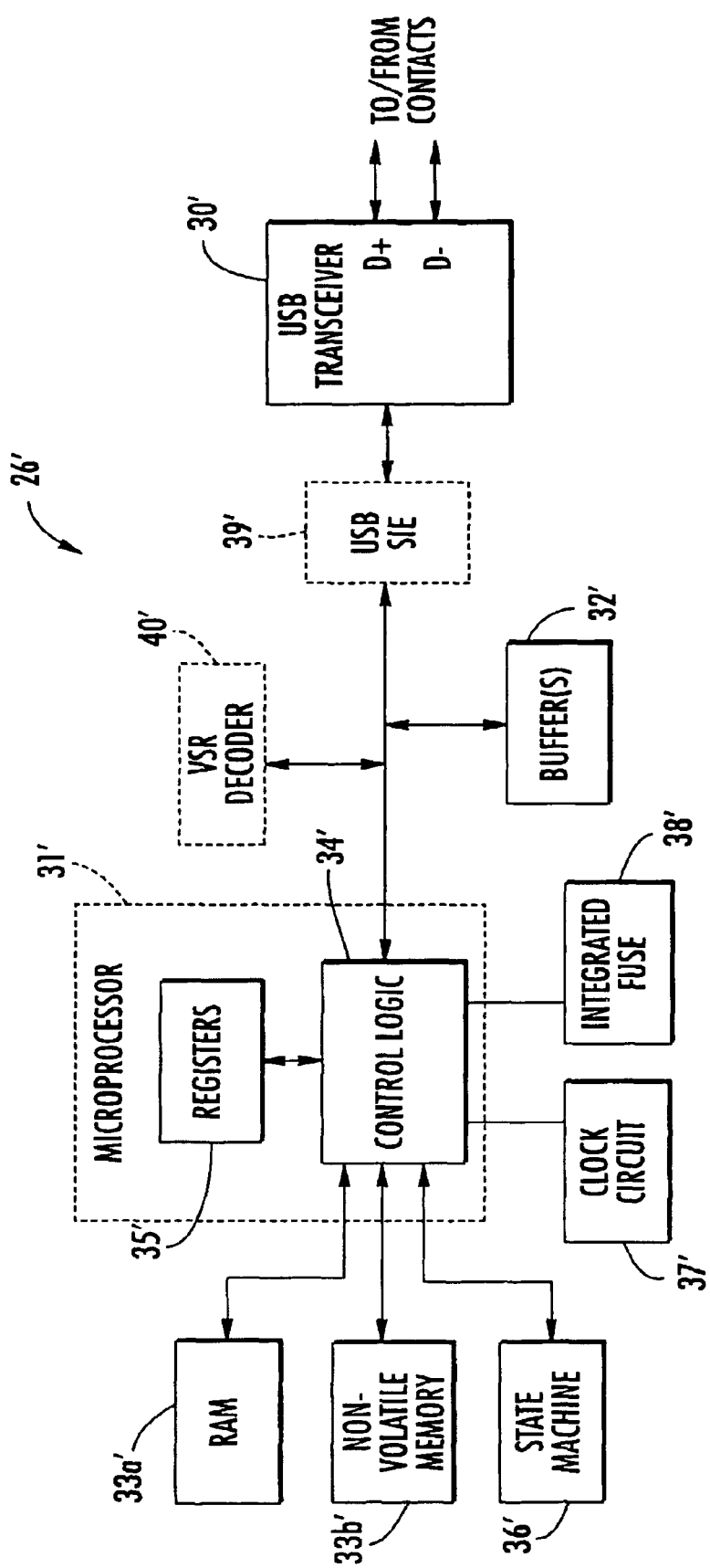
FIG. 3 is a more detailed schematic block diagram of a universal serial bus (USB) embodiment of the smart card integrated circuit of FIG. 2.

Referring more particularly to FIG. 3, an exemplary embodiment of the IC 26' for operating in a USB mode is now described. The IC 26' includes a USB transceiver 30', which includes first and second input/outputs (I/Os) D+ and D−, as set forth in the USB Specification. Moreover, in the illustrated embodiment the controller 31' is implemented with a microprocessor which includes control logic 34' and one or more registers 35' for use by the control logic in performing various operations, as will be appreciated by those skilled in the art.

Moreover, the IC 26' also illustratively includes random access memory (RAM) 33a', and non-volatile memory 33b' (e.g., electrically erasable programmable read only memories (EEPROMs), etc.). The RAM 33a' may be used for storing data to be processed, for example, while the non-volatile memory 33b' may be used for storing permanent and/or semi-permanent information which needs to be retained by the IC 26' when not connected to (and powered by) the smart card reader 23.

In some embodiments, the IC 26' may also include a state machine 36' for performing certain dedicated processing functions, as will be discussed further below. Moreover, a clock circuit 37' may also be included in the IC 26' for keeping a USB system time. By way of example, upon first being connected to the smart card reader 23, as part of an internal initialization the IC 26' may receive a current system time from the host device 21 which will be used as a starting value for the clock circuit 37' to maintain the current system time for the control logic 34'.

The IC 26' may also optionally include a USB serial interface (SIE) engine 39' connected between the USB transceiver 30' and the microprocessor 31' which is for translating USB encoded data received from the host device 21 to a serial data stream for the control logic 34', and vice-versa for data being sent upstream to the host device. Moreover, a VSR decoder (and/or encoder) 40' may also optionally be connected between the USB transceiver 30' and the microprocessor 31' for decoding (and/or encoding) VSR data which would not ordinarily be handled by a standard USB serial interface engine. VSR data will be discussed further below. Of course, it should be noted that in some embodiments the functionally of the USB SIE 39' and/or VSR decoder 40' could be implemented within the microprocessor 31', if desired.

In accordance with one particularly advantageous aspect of the invention, which will now be described with reference to FIGS. 4–7, the non-volatile memory 33b' may be used to store a set of default requests to be used for communications between the IC 26' and the host device 21. That is, the default requests are instructions or commands that the host device 21 and IC 26' use to inform one another what operations are to be performed. Furthermore, one or more alternate requests is also defined for each default request and selectively interchanged or switched with the default requests during communications between the smart card 24 and the host device 21. That is, each alternate request is understood by the microprocessor 31' and the host device 21 to correspond to the same instruction or command as its respective default request, even though the alternate request appears to be a completely different request to a would-be hacker, for example.

To this end, the USB Specification defines a base set of USB requests for communications in USB systems, some or all of which may be used by a particular vendor in the set of default requests to be stored in the non-volatile memory 33b' for a given product. Furthermore, in addition to the base set of USB requests, the USB Specification also provides a mechanism by which product vendors may enhance and personalize the USB communications between the host device 21 and smart card 24. That is, the USB Specification provides for the definition and use of vendor specific requests (VSRs) to define additional operations which are appropriate for a given smart card device or application. Accordingly, the default requests may include such vendor-defined requests as well.

To aid in understanding the present aspect of the invention, the basic structure of a USB transaction will first be described with reference to FIG. 4. In general, USB requests (including VSRS) between a host device and a smart card take the form shown in the illustrated example. In particular, the illustrated USB transaction is for a USB control mode transaction downstream from the host device 21 to the smart card 24. For clarity of illustration, data sent from the host device 21 to the smart card 24 is illustrated with dashed boxes, and data sent from the smart card to the host device is illustrated with solid boxes in FIG. 4.

A VSR may be established by creating an appropriate DATA0 packet in the illustrated setup stage, for example. Alternately, VSRs may be more complicated, requiring a proper DATA0 packet in the setup stage, for example, followed by one or more data stage packets. Use of VSRs is the same for all control mode transfers and is usually accompanied by one or more data stage packets and the status state. The format of the setup packet DATA0 is provided in Table 1, below. Further details regarding USB transactions may be found in the USB Specification.

TABLE 1

| Request | bmRequestT | bRequest | wValue | wIndex | wLength | Mode |
|---|---|---|---|---|---|---|
| Get-Config'n | 80h | 08h | 0000h | 0000h | 0100h | IN |
| Get-Descriptor | 80h | 06h | <idx/typ> | <0h/lnid> | <lngth> | IN |
| Get-Interface | 81h | 0Ah | 0000h | <intfc> | 0100h | IN |
| Get- | 80h | 00h | 0000h | <zie> | 0200h | IN |

TABLE 1-continued

| Request | bmRequestT | bRequest | wValue | wIndex | wLength | Mode |
|---|---|---|---|---|---|---|
| Status | 81h | 00h | 0000h | <zie> | 0200h | IN |
|  | 82h | 00h | 0000h | <zie> | 0200h | IN |
| Set-Address | 00h | 05h | <address> | 0000h | 0000h | OUT |
| Set-Confgrt'n | 00h | 09h | <config> | 0000h | 0000h | OUT |
| Set-Descriptor | 00h | 07h | <idx/typ> | <0h/lnid> | <lngth> | OUT |
| Set-Feature | 00h | 03h | <feature> | <zie> | 0000h | OUT |
|  | 01h | 03h | <feature> | <zie> | 0000h | OUT |
|  | 02h | 03h | <feature> | <zie> | 0000h | OUT |
| Set-Interface | 01h | 09h | <altstg> | <intfc> | 0000h | OUT |

A VSR may be defined using the bmRequestType and bRequest fields of the setup stage data packet, and associated payload size in the wLength field. Thus, some parameters for a VSR are conveyed as part of the data packet in the setup stage. Additional parameters for the VSR can be conveyed in the data stage of the transfer. Alternately, another request could be conveyed in the data stage. The data bytes of the data stage, regardless of the particular USB mode being implemented (e.g, control, interrupt, isochronous, or bulk) can be treated in whatever fashion the smart card directs, insofar as the transmission of these bytes follows the USB protocol rules and/or conventions.

Figure 7:
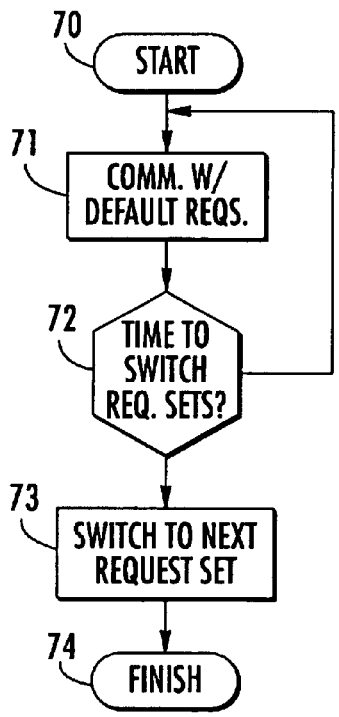
FIGS. 7 and 8 are flow diagrams illustrating methods for using default and alternate requests in accordance with the invention for communications between the smart card and host device of the smart card system of FIG. 1 to provide enhanced security.

Referring now to FIG. 7, in accordance with the present aspect of the invention, beginning at Block 70, the microprocessor 31' initially uses the default requests for communicating with the host device 21, at Block 71. By way of example, the microprocessor 31' and host device 21 may use the default requests during the initialization of the smart card 24 after first being connected to the smart card reader 23. Thereafter, the microprocessor 31' and, correspondingly, the host device 21, selectively switch between using the default requests and the alternate requests for communicating therebetween. That is, at a mutually agreed upon time (Block 72), the microprocessor 31' and the host device 21 both switch over to using the alternate requests, at Block 73, thus concluding the illustrated method (Block 74).

In another variation, a key seed may be used to generate a unique identifier. In such case, the smart card 24 uses a default or alternate request to transmit to the host device 21 information/data which may include the unique identifier. The next time the host device 21 transmits information/data to the smart card 24, this unique identifier is also included, and is used by the smart card to reaffirm a secure connection to the host device. Then, for example, the host device 21 computes its unique identifier and sends it with data or information to the smart card 24.

On the next reverse data flow, the smart card 24 returns the unique identifier of the host device 21, which the host device uses to reaffirm a secure connection. This can be going on at the same time as those activities described above, for example. It should be noted that such layered obscurity may be more easily accomplished via USB than with ISO protocols, due to bandwidth and overhead considerations. In any event, this makes eavesdropping more difficult and may help thwart attack attempts by such mechanisms to prevent "replay attacks" and "man-in-the-middle" attacks, for example, as will be appreciated by those skilled in the art.

By switching between default requests and alternate requests, the actual request being sent between the microprocessor 31' and host device 21 in essence becomes a "moving target" for a would-be hacker to attempt to decipher. That is, because the form of the request used for a given operation changes each time the host device 21 and microprocessor 31' switch between default/alternate requests, it becomes much more difficult for a would-be hacker to determine which requests are used for which smart card operations and, thus, to decipher and interfere with data communications.

Figure 8:
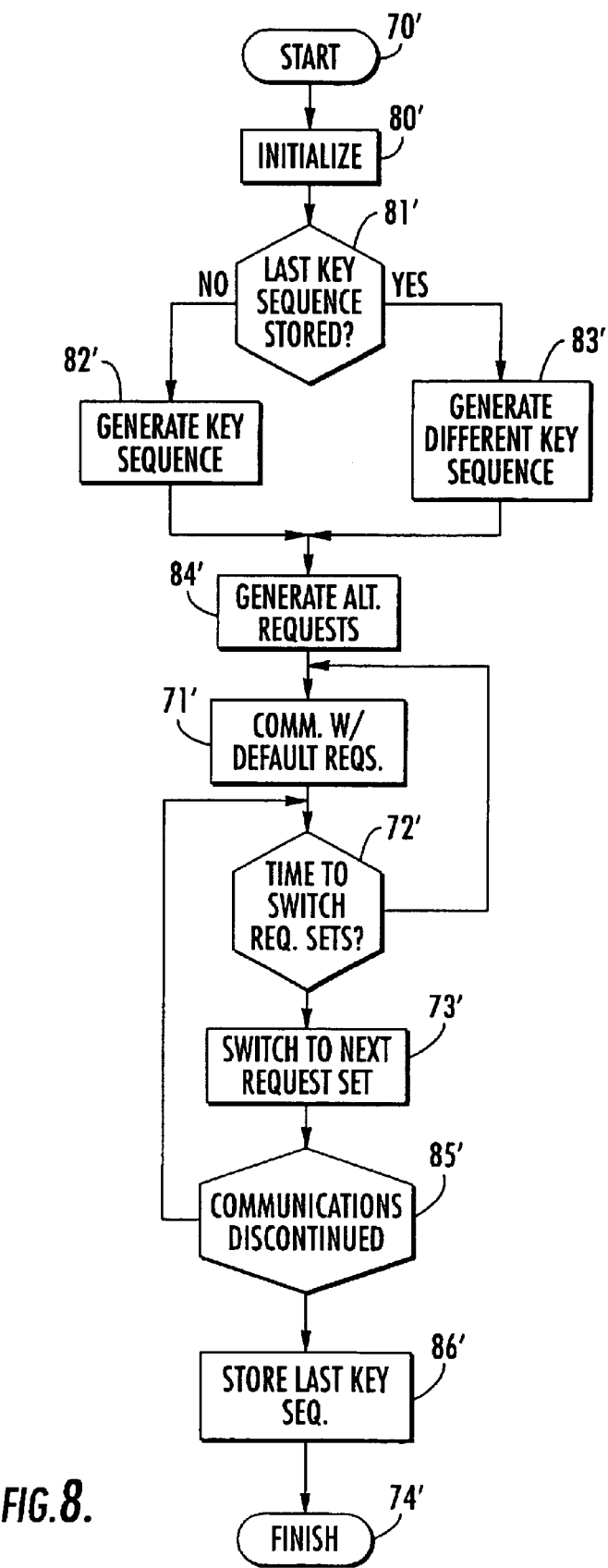

Further features of this aspect of the invention will now be described with reference to FIG. 8. The microprocessor 31' preferably generates the alternate requests during an initialization or enumeration, as previously described above. During the manufacturing process of the IC 26', the default requests are stored in the non-volatile memory 33b' along with a secure key seed. More particularly, upon initialization, at Block 80', the microprocessor 31' first determines whether a last key sequence from a prior session with the host device 21 has been stored in the non-volatile memory 33b', at Block 81', as will be described further below.

If not, the microprocessor 31' generates a key sequence using the key seed, at Block 82', using a pseudorandom number generator, for example, as will be appreciated by those of skill in the art. Alternately, if a last key sequence was stored in the non-volatile memory 33b', the microprocessor 31' will similarly generate a key sequence but would ensure that this new key sequence was different from the stored key sequence at Block 83'. This is preferably done to make it even less likely that a would-be hacker will be able to observe a same operation multiple times with the same request, which could make deciphering the requests easier.

Thus, at the end of a session between the smart card 24 and the host device 21, the microprocessor 31' stores the last key sequence used in the non-volatile memory 33b', at Blocks 85' and 86'. The driver application at the host device 21 could purge the key seed and all other information used in generating the alternate commands upon termination of a session if desired to reduce the chance that this information will be obtained by a would-be hacker, although it could also be retained as well.

The microprocessor 31' then generates the alternate requests based upon the generated key sequence and the set of default requests stored in the non-volatile memory 33b'. The alternate requests may be stored in the RAM 33a', for example. In this way the alternate requests will be erased upon termination of the connection with the smart card reader 23. It should be noted that the microprocessor 31' could generate any number of alternate request sets for the set of default requests during initialization. Moreover, the microprocessor 31' could generate additional sets of alternate requests later in a session with the host device 21, such as in response to a perceived attack on the system, or simply at predetermined intervals or mutually agreed upon times with the host device.

In the event that the requests being used by the host device 21 and the microprocessor 31' fail to match at some point, various approaches could be used to rectify the situation. For example, the host device 21 and the microprocessor 31' could revert back to the default requests and re-establish additional sets of alternate requests as if the microprocessor was being initialized. Of course, the session could be terminated so that the microprocessor 31' would in fact have to go through initialization again. Other suitable approaches may also be used in accordance with the invention.

In this regard, various approaches may also be used to provide the alternate requests to the host device 21 so that it will be able to not only use the requests that the microprocessor 31' expects to see, but also so it can correctly interpret the requests it receives from the microprocessor. One approach is to simply transmit all of the alternate commands generated by the microprocessor 31' to the host device 21. However, this approach requires more bus time, plus it makes the alternate commands more susceptible to being intercepted and deciphered. As such, a more preferable approach would be to encrypt the key seed and forward it to the host device 21 during initialization, for example. The host device 21 could then generate the same sets of alternate requests as the microprocessor 31'. The host device 21 could also store any last key sequence used, as described above, to make sure the next key sequence generated during the next session with the smart card 24 will coincide with that used by the microprocessor 31'.

Of course, it should be noted that in some embodiments it may be desirable to simply store one or more sets of alternate requests in the non-volatile memory 33b' during the manufacturing processes and have the microprocessor 31' simply switch between these pre-defined sets. In such case, the alternate commands could also be incorporated with the smart card driver software application installed at the host device 21 for reading the smart card 24. Of course, these pre-stored alternate requests could also be transmitted to the host device 21 at the beginning of each session, as described above.

Furthermore, various approaches may be used for determining when the microprocessor 31' and host device 21 will selectively switch between using default requests and alternate requests, as will be further understood with reference to FIGS. 5 and 6. These drawings illustrate a series of separate downstream USB transmissions from the host device 21 to the smart card 24 similar to that illustrated in FIG. 4. Generally speaking, the host device 21 and microprocessor will agree on the number of sets of alternate requests that will be generated and when, when they will switch between them, etc. Some of these parameters could also be set ahead of time, as will be appreciated by those skilled in the art.

In any event, one possibility is that the microprocessor 31' and the host device 21 will selectively switch between using the default requests and the alternate requests on a rotating basis. This could also be done a pseudorandom basis, as will be understood by those skilled in the art. A switch from a default request for an operation A (i.e., Default_Reg (A)) in a first USB transmission group (1) to a corresponding alternate request for the same operation A (i.e., Alt_Req(A)) in a subsequent transmission group (2) is shown in FIG. 5. Of course, other switching approaches may also be used, as will be appreciated by those of skill in the art.

To provide even further security, the way in which the microprocessor 31' and host device 21 associate the default and alternate requests with respective groups of data packets may also be altered. For example, the microprocessor 31' and host device 21 may insert the default and alternate requests in a predetermined location (which could vary on a rotating basis, for example) within data stage groups. For example, in the second transmission group (2) in FIG. 5 the alternate request is third in the transmitted order. Similarly, the microprocessor 31' and host device 21 may determine the order on a pseudorandom basis. Of course, other suitable approaches may again be used.

Further still, at least one other data packet may also be pseudorandomly inserted in the data stage groups, such as a "bogus" data packet to further confuse a would-be hacker. A bogus data packet is illustratively shown in the third transmission group of FIG. 5. The bogus data packets may themselves be pseudorandomly generated.

Additionally, the microprocessor 31' and host device 21 may even send the default and alternate requests along with groups of data packets with which they are not associated, as is the case illustrated in FIG. 6. That is, the first transmission group (1) includes an alternate request for an operation C, but it is transmitted along with the data or other requisite parameters or information to be used for performing an operation B, as will be appreciated by those skilled in the art. In turn, the second transmission group (2) includes the alternate request for the operation (B), but the data for the operation (C).

By selecting the location of the requests in relation to their respective data packets as described above, this provides even further protection against hacking in that a would-be hacker would not only have to determine what the alternate requests are for, but he would also have to determine where these requests are located. As with the switching between the default and alternate commands, the location of the requests could also be coordinated with the host device 21 so that both look to the same place for requests at the same time.

It should be noted that the microprocessor 31' and the host device 21 may also encrypt the default and alternate requests prior to sending for still further security. It should also be noted that the algorithms used for performing the various functions described above may be implemented with hardware, software, or a combination of both, depending upon the given application and performance parameters, as will be understood by those skilled in the art.

Moreover, the above described aspect of the invention may also advantageously be implemented in other applications beyond USB, or even ISO7816, smart cards. By way of example, this approach may be more generally applied to other forms of packet-based communications applications, or used when ISO commands are embedded within USB transmission groups, as is sometimes performed in certain applications. Further, within an appropriate implementation, this approach will work with other embedded command structures, as will be appreciated by those skilled in the art. Further, it may be scaled with respect to which of the above features are implemented in a given application in accordance with consumption of needed resources, available bandwidth, available computing capacity, etc. Moreover, once implemented it may require little or no human intervention to maintain in many applications.

More particularly, it will be appreciated based upon the above description that a given implementation for a particular application may be dynamically altered, or the desired features may be fixed ahead of time. The above security measures may also be implemented in a substantially "transparent" fashion, with respect to other application of both the host device 21 and the smart card 24. This approach also takes advantage of other on-chip features of the IC 26', and it lends itself to the use of more sophisticated driver applications which are even more secure and difficult to attack. Indeed, to a would-be hacker observing standard USB protocols, any intercepted transmissions would appear to not only produce setup transactions with a seeming random set of VSRs, but the data payloads would not lend themselves to an easily discernable pattern of repeatability or recognition.

Figure 9:
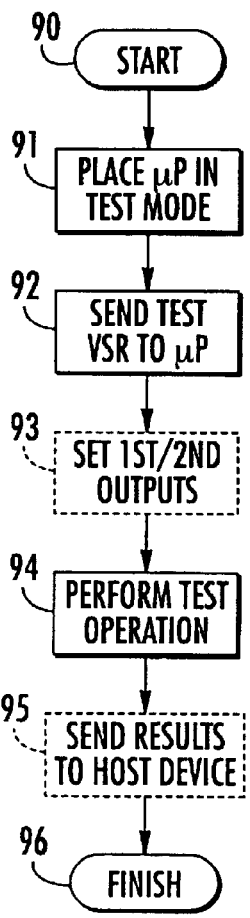
FIG. 9 is a flow diagram illustrating a method for performing various internal test operations of the integrated circuit of FIG. 3 using test VSRs in accordance with the present invention.

Turning now additionally to FIG. 9, another advantageous aspect of the invention for using test VSRs to cause the IC 26' to advantageously perform internal tests is now described. As noted above, to extensively test an integrated circuit during the manufacturing process typically requires the use of extremely expensive test machines which are, because of their cost, in short supply. Thus, to extensively test large amounts of such circuits simply becomes cost prohibitive. Moreover, there are certain tests which are difficult, if not impossible, for such external test machines to perform on an integrated circuit, depending upon the architecture of a give IC, as will be appreciated by those skilled in the art.

In accordance with the present aspect of the invention, the method begins (Block 90) by placing the IC 26' in a test mode, at Block 91, which is preferably done during the manufacturing process. By way of example, the IC 26' may include a switch, such as an integrated fuse 38', that is connected to the microprocessor 31' which, when closed, causes the microprocessor to operate in the test mode. A set of test VSRs (and associated actions to be performed in response thereto) is downloaded to the non-volatile memory 33b', for example, for use in the test mode. This may be done at the same time the normal operating requests are downloaded to the non-volatile memory 33b' (i.e., the default requests discussed above), for example, which are used for performing smart card operations when the microprocessor 31' is placed in a user mode.

In particular, the microprocessor 31' is preferably designed such that when it is in the test mode, it will only recognize and act upon the test VSRs. Moreover, when testing is completed, the fuse 38' may be blown to permanently switch the microprocessor 31' to the user mode, at which point the microprocessor recognizes and acts upon the normal operating (i.e., default) requests. This configuration advantageously makes it more difficult for unauthorized persons to gain access to the test VSRs. Of course, it would also be possible to purge the test VSRs after testing, if desired, but this may be more time consuming in some applications. Furthermore, the test VSRs may be encrypted for additional security, as previously discussed above, and the microprocessor 31' will thus decrypt the test VSRs when in the test mode.

Accordingly, to perform desired test operations, when in the test mode the appropriate test VSRs may be sent to the microprocessor 31' being tested, at Block 92', at which point the microprocessor will perform the desired test operation based thereon, at Block 94. That is, the IC 26' may advantageously perform numerous built-in self tests (BISTs) or other internal tests which would otherwise require the use of expensive external test machines.

It should be noted that for certain tests, it may optionally be desirable to set the I/Os D+ and D− to a desired state to test certain parameters, at Block 93, such as output impedance, high/low output drive, loading characteristics, etc. Of course, setting these outputs to a desired state could be the test operation in and of itself, or this could be done while another test operation is being performed so that such parameters can be observed while the test operation takes place, as will be appreciated by those skilled in the art. The I/Os D+ and D− could both be set to the same state, or to different states, depending upon the particular test operation to be performed. Similarly, during a test operation (or as the test operation itself), the microprocessor 31' and/or other components of the IC 26' may be made to operate with reduced power to determine how the IC will operate in low power situations.

Several exemplary test operations which may be performed in accordance with the present aspect of the invention will now be discussed. However, it should be noted that these examples are by no means an exhaustive list of the test operations which may be performed in accordance with the invention, and other test applications which may similarly be performed, as will be readily apparent to those of skill in the art, for various IC architectures and applications.

By way of example, one particularly advantageous test operation which may be performed is a scan test of the control logic 34', as will be appreciated by those skilled in the art. Another exemplary test operation is to perform a BIST on or detect a status of the buffer(s) 32', or to modify and/or access the buffer. The same could similarly be done for status registers and/or interface registers which may be included in certain embodiments of the IC 26', as will be appreciated by those of skill in the art. Moreover, test VSRs may also be used in a control transfer mode to cause the microprocessor 31' to allow direct read/write access to the buffer 32' for a certain amount of data (e.g., 64 bytes) without intervention from the microprocessor, as will be appreciated by those skilled in the art.

It should be noted that the same (or different) test VSR which causes the buffer test operation may also cause the microprocessor 31' to prohibit access to the buffer 32' during these test operations to prevent the test from being compromised. Moreover, in certain embodiments more than one buffer 32' may be used. In such case, one potential test operation is to write test data to one or more designated buffers 32' and subsequently send the test data from the designated buffer(s) to the host device 21. In this way, the correct operation of each buffer can be individually verified, if desired.

Upon completion of a given BIST or other internal test, the same (or another) test VSR may be used to cause the microprocessor 31' to generate test results, such as a pass or fail indicator, and send the results to the host device 21, at Block 95, thus concluding the illustrated method (Block 96). In the same way, if the test operation generates specific data, this data could be forwarded to the host device 21 so that it may determine whether the test operation was successfully completed.

Other exemplary test operations may include: reading control and status register (CSR) contents, endpoint buffer (EPB) contents, or other similar content; modifying various CSR registers and preloading one or more EPBs; performing scan tests where a sample occurs after a next (enabled) rising clock edge; and delay-fault scan testing, where a sample occurs after a second (enabled) rising clock edge. Another test operation is a clock BIST and/or recovery test. That is, after the clock circuit 37' is calibrated as described above, the clock signal frequency therefrom can be determined and compared with maximum and minimum thresholds stored in the non-volatile memory 33b' (or elsewhere), for example, to determine whether the clock circuit is functioning correctly.

Further exemplary test operations may include BISTs of the RAM 33a', non-volatile memory 33b', USB SIE 39', and/or VSR decoder 40'. Moreover, internal serial shift loop scan tests may also be performed, as will be appreciated by those skilled in the art. Of course, the microprocessor 31' may include the appropriate circuitry or logic for implementing the above-described tests, as will also be appreciated by those skilled in the art. Additionally, an internal JTAG controller could also be included in the IC 26' to cooperate with the microprocessor 31' for performing the internal serial shift loop scan tests, for example.

Figure 10:
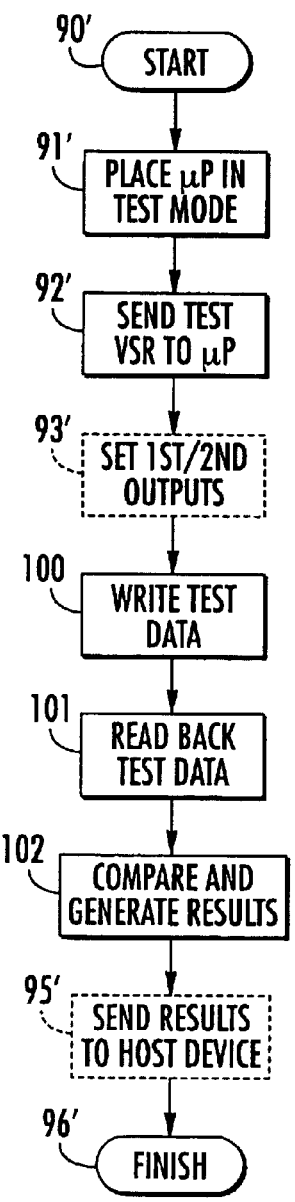
FIG. 10 is a flow diagram illustrating a method for performing an internal read back test of the integrated circuit of FIG. 3 using test VSRs in accordance with the present invention.

Turning now additionally to FIG. 10, another particularly advantageous internal test for the IC 26' is now described. In accordance with this aspect of the invention, when in the test mode, upon receiving the appropriate test request from the host device 21 the microprocessor 31' will cause the USB transceiver 30' to output certain test data, at Block 100. The microprocessor 31' will then read back the test data output by the transceiver 30' (which could be done through the transceiver), at Block 101, e.g., using a loop-back path implemented during the test mode, as will be appreciated by those of skill in the art. The loop-back could connect to the buffer 32' so the data is read back to the buffer, for example.

Further, the microprocessor 31' then compares the output test data with the read back test data and generates test results for the USB host device based upon the comparison, at Block 102. As similarly described above, the test results may take the form of a pass/fail indicator, for example, or other appropriate form for a given test application.

More particularly, a given test VSR may cause the microprocessor 31' to cause the state machine 36' to generate the test data to be output by the transceiver 30'. By way of example, the test data generated by the state machine 36' could advantageously include one or more repeating patterns in a serial bitstream. Of course, repeating pattern generation circuitry could instead be included in the microprocessor 31', for example, in some embodiments. In either event, the microprocessor 31' may thus cause the USB transceiver to continuously output this repeating test data. Such repetitive testing is useful for characterizing certain parameters of both the digital and analog components of the IC 26' design which may not otherwise be accessible using external test machines, as will be appreciated by those skilled in the art.

The above-described test may also be used to detect timing errors. For example, the test data may be synchronized with the clock signal from the clock circuit 37'. The microprocessor 31' may thus extract the data and clock information from the read back data, and compare the clock information to determine any deviation therein. This deviation can then be compared to minimum and maximum values stored in the RAM 33a' or registers 35', for example, to determine whether timing errors are occurring, as will be appreciated by those skilled in the art. It should also be noted that in some embodiments the test data may be output by and looped back from other output circuitry, such as an interface register, for example, to test the operation thereof in addition to (or instead of) the transceiver 30', as will be appreciated by those of skill in the art.

Figure 11:
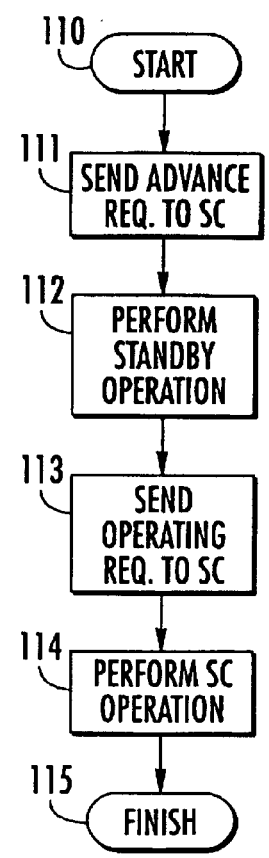
FIG. 11 is a flow diagram illustrating a method for using advance requests in accordance with the invention for communications between the smart card and host device of the smart card system of FIG. 1 to provide enhanced system performance.

Yet another advantageous aspect of the invention for enhancing performance of the smart card system 20 will now be described with reference to FIG. 11. As noted above, when in the normal operating or user mode, the microprocessor 31' receives operating requests (e.g., the default and/or alternate requests described above) and performs smart card operations based thereon. However, in a USB environment, for example, the shared communications bus has only a single master at all times (e.g., the host device 21) which is responsible for scheduling all activity on the bus. The bus bandwidth is shared among all of the USB devices connected thereto.

Of course, each device will likely have a particular bandwidth requirement to ensure its proper functionality. These requirements are generally addressed using the four major modes of bandwidth allocation set forth in the USB Specification, namely control mode, interrupt mode, bulk mode, and isochronous mode. Yet, it is also possible for a sufficiently endowed USB device to provide services to multiple simultaneous applications, each with its own multiple endpoints. Each of these applications, in turn, may also have its own bandwidth requirements for the corresponding services needed of the USB device.

Accordingly, in such situations, system performance may be significantly compromised where certain devices are required to wait for significant durations to access the shared system bus. By way of example, if a device has generated and loaded time sensitive data to its output buffer to be transmitted to the host device 21, if an ill-timed request is received from the host device for some unexpected operation the buffered data could be corrupted. This would necessitate reloading (and possibly even regenerating) the data into the buffer at a later time, which translates to less efficient bandwidth utilization and, consequently, a reduction in performance.

Another example where pre-buffered data could be lost is where two or more active endpoints necessitate an upstream transfer of data. Such data could be in a large enough quantity to require multiple buffers to transmit. What is not known is which of the endpoints will be requested to transmit its associated data first. The first buffer of data might be queued first for each endpoint, for example. When the IN request arrives, the associated endpoint is identified, and the corresponding data in the buffer is transmitted. Meanwhile, the microprocessor 31' would proceed to push the next group of data into one of the other available buffers, possibly losing the pre-queued data for another endpoint. At this point, of course, the lost data must be accounted for, and possibly re-acquired in anticipation of its IN request.

To avoid these and other types of situations which can reduce system performance, a set of advance requests may be used in accordance with the present aspect of the invention to provide advanced warning to the microprocessor 31' of impending bus transfers or other events which might cause bottlenecking through its buffers 32'. Further, this approach may also be used to warn of other performance draining operations, or simply as a "heads-up" that it plans (or does not plan) to request that the microprocessor 31' perform a desired operation. This provides the microprocessor 31' an opportunity to schedule its onboard operations, resources, and/or data management accordingly.

Beginning at Block 110, the host device 21 first sends one or more advance requests to the microprocessor 31', at Block 111, indicating that one or more respective operating requests will follow. The advance requests may be implemented as VSRs, for example, as previously described above. In response, the microprocessor 31' performs a standby operation to prepare for the subsequent operating request, at Block 112. When the subsequent operating request is sent from the host device 21 to the smart card 24, at Block 113, the microprocessor 31' is then prepared to perform the respective smart card operation, at Block 114, thus concluding the illustrated method.

Accordingly, the host device 21 can use the advance request to give the microprocessor 31' advance warning that it is about to request a particular smart card operation. The microprocessor 31' is thus able to more efficiently schedule its use of the integrated circuit resources so that certain smart card operations are not needlessly repeated at the cost of overall performance.

By way of example, the standby operation may include loading particular data in the buffer 32' that is required by the host device 21. This data may already be stored at the smart card 24, for example, or it may need to be generated by the microprocessor 31'. In such case, the subsequent operating request received from the host device 21 would cause the microprocessor 31' to send the data stored in the buffer 32' to the host device. In this way, utilization of the host device's communications bus can be significantly enhanced. That is, based upon the advance request, the microprocessor 31' can generate and/or retrieve the data requested by the host device 21 before it is needed and load this data in the buffer 32' until the host device is ready for it. As such, the system bus need not be held up while the microprocessor 31' generates and/or retrieves the data.

Another standby operation is to disable data transmission to the host device 21, and the subsequent operating request can then enable data transmission to the host device once again. That is, the host device 21 can use the advance request to inform the microprocessor 31' that the system bus is preoccupied with another peripheral device, etc., so that the microprocessor 31' will not attempt to use the bus during this time. Similarly, the microprocessor 31' can be warned that a next endpoint will be an IN, so that the microprocessor can prepare as necessary to proceed accordingly at this next endpoint.

Still another exemplary standby operation is to ceasing performing a current smart card operation, so that the microprocessor 31' can perform a different smart card operation based upon the subsequent operating request. As such, the host device 21 can direct the microprocessor 31' to perform a higher priority task and postpone the current smart card operation until a later time.

It should be noted that the various features described above may advantageously be embodied more generally in integrated circuits for other USB, ISO7816, or other devices beyond smart card devices, as will be appreciated by those skilled in the art. Additional features of the invention may be found in co-pending applications entitled SMART CARD WITH ENHANCED SECURITY FEATURES AND RELATED SYSTEM, INTEGRATED CIRCUIT, AND METHODS; Ser. No. 10/434,913; UNIVERSAL SERIAL BUS (USB) SMART CARD HAVING ENHANCED TESTING FEATURES AND RELATED SYSTEM, INTEGRATED CIRCUIT, AND METHODS, Ser. No. 10/434,820; and SMART CARD FOR PERFORMING ADVANCE OPERATIONS TO ENHANCE PERFORMANCE AND RELATED SYSTEM, INTEGRATED CIRCUIT, AND METHODS, Ser. No. 10/434,821, the entire disclosures of which are hereby incorporated herein by reference.

Moreover, many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An integrated circuit for a smart card comprising:
a universal serial bus (USB) transceiver; and
a microprocessor connected to said USB transceiver and operable in a test mode and a user mode;
said microprocessor when in the test mode upon receiving
at least one test request from a USB host device
causing said USB transceiver to output test data,
reading back the test data output by said USB transceiver,
comparing the test data with the test data read back from said USB transceiver, and
generating test results for the USB host device based upon the comparison.

2. The integrated circuit of claim 1 further comprising a state machine connected to said microprocessor, and wherein said microprocessor when in the test mode upon receiving the at least one test request further causes said state machine to generate the test data.

3. The integrated circuit of claim 1 wherein said microprocessor causes said USB transceiver to continuously output the test data.

4. The integrated circuit of claim 1 wherein said microprocessor causes said USB transceiver to output the test data for a predetermined duration.

5. The integrated circuit of claim 1 further comprising a clock circuit connected to said microprocessor for generating a clock signal; wherein the test data is generated based upon the clock signal; wherein said microprocessor compares the test data with the test data read back from said USB transceiver to determine a timing deviation therebetween; and wherein said microprocessor generates the test results by comparing the timing deviation with at least one timing threshold.

6. The integrated circuit of claim 1 further comprising at least one buffer connected to said USB transceiver and said microprocessor for buffering data transmitted between said USB transceiver and the USB host device; and wherein said microprocessor reads back the data output from said USB transceiver via said at least one buffer.

7. The integrated circuit of claim 1 wherein the at least one test request comprises at least one test vendor specific request (VSR).

8. The integrated circuit of claim 1 further comprising a switch for disabling the microprocessor from operating in the test mode.

9. A smart card for operating in a universal serial bus (USB) mode and comprising:
    a smart card body; and
    an integrated circuit carried by said smart card body and comprising
        a universal serial bus (USB) transceiver, and
        a microprocessor connected to said USB transceiver and operable in a test mode and a user mode,
        said microprocessor when in the test mode upon receiving at least one test request from a USB host device causing said USB transceiver to output test data,
            reading back the test data output by said USB transceiver,
            comparing the test data with the test data read back from the said USB transceiver, and
            generating test results for the USB host device based upon the comparison.

10. The smart card of claim 9 wherein said integrated circuit further comprises a state machine connected to said microprocessor, and wherein said microprocessor when in the test mode upon receiving the at least one test request further causes said state machine to generate the test data.

11. The smart card of claim 9 wherein said microprocessor causes said USB transceiver to continuously output the test data.

12. The smart card of claim 9 wherein said microprocessor causes said USB transceiver to output the test data for a predetermined duration.

13. The smart card of claim 9 wherein said integrated circuit further comprises a clock circuit connected to said microprocessor for generating a clock signal; wherein the test data is generated based upon the clock signal; wherein said microprocessor compares the test data with the test data read back from said USB transceiver to determine a timing deviation therebetween; and wherein said microprocessor generates the test results by comparing the timing deviation with at least one timing threshold.

14. The smart card of claim 9 wherein said integrated circuit further comprises at least one buffer connected to said USB transceiver and said microprocessor for buffering data transmitted between said USB transceiver and the USB host device; and wherein said microprocessor reads back the data output from said USB transceiver via said at least one buffer.

15. The smart card of claim 9 wherein the at least one test request comprises at least one test vendor specific request (VSR).

16. The smart card of claim 9 wherein said integrated circuit further comprises a switch for disabling the microprocessor from operating in the test mode.

17. A universal serial bus (USB) smart card system comprising:
    a USB host device comprising a USB port;
    a USB smart card reader connected to said USB port; and
    a USB smart card for communicating with said USB host device via said smart card reader and comprising
        a smart card body, and
        an integrated circuit carried by said smart card body and comprising
            a universal serial bus (USB) transceiver, and
            a microprocessor connected to said USB transceiver and operable in a test mode and a user mode, said microprocessor when in the test mode upon receiving at least one test request from said USB host device causing said USB transceiver to output test data, reading back the test data output by said USB transceiver, comparing the test data with the test data read back from said USB transceiver, and generating test results for the USB host device based upon the comparison.

18. The smart card system of claim 17 wherein said integrated circuit further comprises a state machine connected to said microprocessor, and wherein said microprocessor when in the test mode upon receiving the at least one test request further causes said state machine to generate the test.

19. The smart card system of claim 17 wherein said microprocessor causes said USB transceiver to continuously output the test data.

20. The smart card system of claim 17 wherein said microprocessor causes said USB transceiver to output the test data for a predetermined duration.

21. The smart card system of claim 17 wherein said integrated circuit further comprises a clock circuit connected to said microprocessor for generating a clock signal; wherein the test data is generated based upon the clock signal; wherein said microprocessor compares the test data with the test data read back from said USB transceiver to determine a timing deviation therebetween; and wherein said microprocessor generates the test results by comparing the timing deviation with at least one timing threshold.

22. The smart card system of claim 17 wherein the integrated circuit further comprises at least one buffer connected to said USB transceiver and said microprocessor for buffering data transmitted between said USB transceiver and the USB host device; and wherein said microprocessor reads back the data output from said USB transceiver via said at least one buffer.

23. The smart card system of claim 17 wherein the at least one test request comprises at least one test vendor specific request (VSR).

24. The smart card system of claim 17 wherein said integrated circuit further comprises a switch for disabling the microprocessor from operating in the test mode.

25. A method for testing an integrated circuit comprising a universal serial bus (USB) transceiver and a microprocessor connected to the USB transceiver and operable in a test mode and a user mode, the method comprising:
  placing the microprocessor in the test mode;
  sending at least one test request to the microprocessor from the USB host device; and
  based upon the at least one test request,
    causing the USB transceiver to output test data,
    reading back the test data back from the USB transceiver,
    comparing the test data with the test data read back from the USB transceiver, and
    generating test results for the USB host device based upon the comparison.

26. The method of claim 25 wherein the integrated circuit further comprises a state machine connected to the microprocessor; and further comprising, based upon the at least one test request, causing the state machine to generate the test data.

27. The method of claim 25 wherein causing the USB transceiver to output the test data comprises causing the USB transceiver to continuously output the test data.

28. The method of claim 25 wherein causing the USB transceiver to output the test data comprises causing the USB transceiver to output the test data for a predetermined period.

29. The method of claim 25 further comprising, based upon the at least one test request, generating the test data based upon a clock signal; wherein comparing comprises comparing the test data with the test data read from the USB transceiver to determine a timing deviation therebetween; and wherein generating comprises generating the test results by comparing the timing deviation with at least one timing threshold.

30. The method of claim 25 wherein the integrated circuit further comprises at least one buffer connected to the USB transceiver and the microprocessor for buffering data transmitted between the USB transceiver and the host device; and wherein reading back comprises reading back the test data output by the USB transceiver via the at least one buffer.

31. The method of claim 25 wherein the at least one test request comprises at least one test vendor specific request (VSR).

32. The method of claim 25 further comprising disabling the microprocessor from operating in the test mode after generates the test results.

* * * * *